(12) United States Patent
Sivaramakrishna Iyer et al.

(10) Patent No.: US 8,934,376 B2
(45) Date of Patent: Jan. 13, 2015

(54) INCREMENTALLY IMPROVED AUTO-DISCOVERY OF NETWORK DEVICES

(71) Applicant: OPNET Technologies, Inc., Bethesda, MD (US)

(72) Inventors: Krisnan Sivaramakrishna Iyer, Cary, NC (US); James Mark Shaw, Cary, NC (US); Jerrold A. Stiffler, Cary, NC (US)

(73) Assignee: Riverbed Technology, Inc., San Francisco, CA (US)

(*) Notice: Subject to any disclaimer, the term of this patent is extended or adjusted under 35 U.S.C. 154(b) by 123 days.

(21) Appl. No.: 13/669,117

(22) Filed: Nov. 5, 2012

(65) Prior Publication Data

US 2013/0067076 A1   Mar. 14, 2013

Related U.S. Application Data

(63) Continuation of application No. 12/544,317, filed on Aug. 20, 2009, now Pat. No. 8,305,931.

(60) Provisional application No. 61/091,421, filed on Aug. 24, 2008.

(51) Int. Cl.
*H04L 12/28* (2006.01)
*H04L 12/24* (2006.01)

(52) U.S. Cl.
CPC .................................. *H04L 41/12* (2013.01)
USPC .......................................................... 370/254

(58) Field of Classification Search
USPC ........................................... 370/254; 709/224
See application file for complete search history.

(56) References Cited

U.S. PATENT DOCUMENTS

| 5,835,720 | A | 11/1998 | Nelson et al. |
|---|---|---|---|
| 7,158,486 | B2 | 1/2007 | Rhodes |
| 2002/0064149 | A1* | 5/2002 | Elliott et al. ................. 370/352 |
| 2005/0246767 | A1* | 11/2005 | Fazal et al. ..................... 726/11 |
| 2006/0083252 | A1 | 4/2006 | Sakuraba et al. |
| 2008/0189405 | A1* | 8/2008 | Zarenin et al. ............... 709/224 |
| 2009/0007223 | A1 | 1/2009 | Centonze et al. |
| 2010/0021044 | A1 | 1/2010 | Zandifar |

* cited by examiner

*Primary Examiner* — Wei Zhao
(74) *Attorney, Agent, or Firm* — Park, Vaughan, Fleming & Dowler LLP

(57) ABSTRACT

The embodiments improve the results of an auto-detection of network devices responsive to the causes of detection failures in preceding runs of the auto-detection process. The network may comprise various devices that are believed to be in the network. If a device that is believed to be in the network, but is undiscovered, the embodiments identify the device and information regarding the cause or causes of non-discovery. In response, the discovery parameters are modified, based on the causes associated with the undiscovered devices. The extent to which the discovery parameters are modified is based various criteria, such as the characterization of the network, or upon the detection of changes to the network.

13 Claims, 3 Drawing Sheets

EXCLUDED ADDRESSES REPORT

Excluded IP Address ---> Reason for exclusion
127.0.0.2--->Device is a part of the exclude list
127.0.0.41--->Device is a part of the exclude list
172.16.1.23--->Did not match required device capabilities
172.16.18.29--->Did not match required device capabilities
172.17.2.15--->Vendor type has not been included
172.17.2.58--->Vendor type has not been included
192.168.50.11--->Vendor type has not been included
192.168.50.42--->Did not match required device capabilities

FIG. 4A

NEIGHBOR ADDRESS REPORT

Local IP Address ---> NeighborAddress|Data Source
10.1.0.9--->10.1.0.1|ipRouteTable
10.1.0.9--->10.1.0.5|ipRouteTable
10.1.0.9--->10.1.1.100|ipNetToMediaTable
10.1.0.9--->10.1.1.101|ipNetToMediaTable
10.10.1.1--->10.10.11.2|cdpTable ipNetToMediaTable and ipRouteTable
10.10.1.1--->10.10.12.2|cdpTable ipNetToMediaTable and ipRouteTable
10.10.1.1--->10.10.121.2|cdpTable ipNetToMediaTable and ipRouteTable
10.10.1.1--->10.10.13.2|cdpTable ipNetToMediaTable and ipRouteTable
10.10.1.1--->10.10.14.2|ipNetToMediaTable and ipRouteTable
10.10.1.10--->10.1.128.6|mplsVpnVrfRouteTable
192.168.51.36--->192.168.51.33|ipNetToMediaTable and ipRouteTable
192.168.51.36--->192.168.51.38|ipNetToMediaTable
192.168.51.36--->192.168.51.39|ipNetToMediaTable

FIG. 4B

INCREMENTALLY IMPROVED AUTO-DISCOVERY OF NETWORK DEVICES

CROSS-REFERENCE TO RELATED APPLICATIONS

This application is a continuation of U.S. Patent Application No. 12/544,317, entitled "Incrementally and Targeted Auto-Discovery of Network Devices," filed Aug. 20, 2009, which claims the benefit of U.S. Provisional Patent Application No. 61/091,421, filed Aug. 24, 2008, which is incorporated by reference herein in its entirety.

BACKGROUND

This invention relates to the field of network analysis, and in particular to a method and system that discovers network devices automatically, using incremental and/or targeted techniques that improve the discovery process.

Maintaining an accurate inventory of devices in a network is a fundamental task for effective network management. In a small network, or a highly stable network, this task can be easily performed manually; but as changes are introduced, or the size of the network grows, it becomes increasingly difficult to determine the specific devices on the network, and how they are interconnected. Without an accurate inventory, routine network analysis tasks, such as the evaluation of proposed changes via simulation, creating dedicated network paths, diagnosing poor performance, and the like cannot reliably be performed.

Tools and techniques are commonly available to facilitate automatic discovery of network devices, typically based on the device's ability to respond to SNMP (Simple Network Management Protocol) queries, as well as queries using other protocols, such as ICMP (Internet Control Message Protocol), TELNET (Teletype Network), SSH (Secure Shell), and so on. For ease of understanding, the examples provided herein are based on SNMP capabilities, although the invention is not limited to SNMP-capable devices.

FIG. 1 illustrates a simplified example of a typical auto-discovery process. The auto-discovery process is typically initiated with a 'seed' list of devices 101 that are believed to be on the network. At 110, the first/next device in the list is read, and a series of queries is sent on the network to the device, at 120, until a response is received, or the series is exhausted. If, at 130, a response was received, the device is added to a list of discovered devices, at 140; otherwise, the device is added to a list of undiscovered devices, at 150. If the device is undiscovered, the next device on the list is subsequently processed, at 110.

When a device is discovered, it is queried for its capabilities, at 160, and based on these capabilities, other queries are sent to identify neighbors of the device, at 170. The new neighbors are added 180 to the list of devices 101 believed to be on the network, and these devices will subsequently be queried 120 to determine whether they are actually on the network (discovered—150), or not (undiscovered—140).

As can well be appreciated, the simplified example of FIG. 1 can be a never-ending process, as the search expands to neighbors of neighbors of neighbors, ad infinitum, and as the search identifies already processed devices as neighbors of their neighbors. Most, if not all, auto-discovery processes have means for terminating the auto-discovery process, limiting the scope of the neighbor discovery, and so on. Common auto-discovery programs maintain a list of previously-processed devices, and either avoid adding the device to the list 101 or avoiding the discovery process 120-150 if the device has previously been processed.

Preferably, the network administrator is provided the opportunity to create explicit lists for inclusion and/or exclusion based on the address of the device, the type of device, the vendor of the device, the protocol used, and so on. These lists may be enforced as each device is received from the list 101, or before each neighbor device is added to the list 101.

The scope of neighbor discovery process is also typically controlled by specifying a hop-limit relative to a specified device or set of devices, a hop being a logical connection between two devices, without an intervening logical device. Neighbors beyond the hop limit from the specified device are excluded from the list 101, or excluded from the discovery process 120-150.

Although avoiding duplicate processing and using inclusion/exclusion lists and hop limits substantially improves the performance of an auto discovery process, such a process can often require hours or days for medium to large scale networks, and the results are rarely complete. Often, when traffic demands are high, responses to SNMP queries are not sent, because providing a response to an SNMP query is typically given a fairly low priority among the tasks that a device is expected to perform. Thus, not every device on the undiscovered device list may, in fact, be absent from the network.

In like manner, the identification of each of a device's neighbors is also not a determinative process. In some cases, the search for a neighbor of a device includes using vendor-proprietary neighbor discovery protocols that ignore devices provided from other vendors. Similarly, neighbors identified in routing tables and the like may be based on stale or inaccurate information.

Repeatedly running the auto-discovery process will not necessarily improve the accuracy or completeness of the resultant discovered and undiscovered lists, as the causes of the errors, such as lack of response due to traffic demands, or the use of outdated information will vary over time, affecting different devices at different times.

It would be advantageous to be able to improve the accuracy and completeness of the results of the auto-discovery process. It would also be advantageous to be able to achieve this improvement in an efficient manner. It would also be advantageous to be able to customize the improvement process for different types of networks. It would also be advantageous to be able to target the discovery process to particular segments of a network.

These advantages, and others, can be realized by a method and system configured to improve the results of an auto-detection of network devices based on the causes of detection failures in preceding runs of the auto-detection process. As each device that is believed to be in the network is found to be undiscovered, the identification of the device and information regarding the cause(s) of non-discovery are stored. Prior to the next auto-detection run, one or more of the discovery parameters are modified, based on the causes associated with the undiscovered devices. The extent to which the discovery parameters are modified is preferably based on the apparent stability of the network, or upon the detection of changes to the network.

BRIEF DESCRIPTION OF THE DRAWINGS

The invention is explained in further detail, and by way of example, with reference to the accompanying drawings wherein:

FIGS. 4A and 4B illustrate example reports provided by an embodiment of an auto-discovery system in accordance with this invention.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

Figure 1:
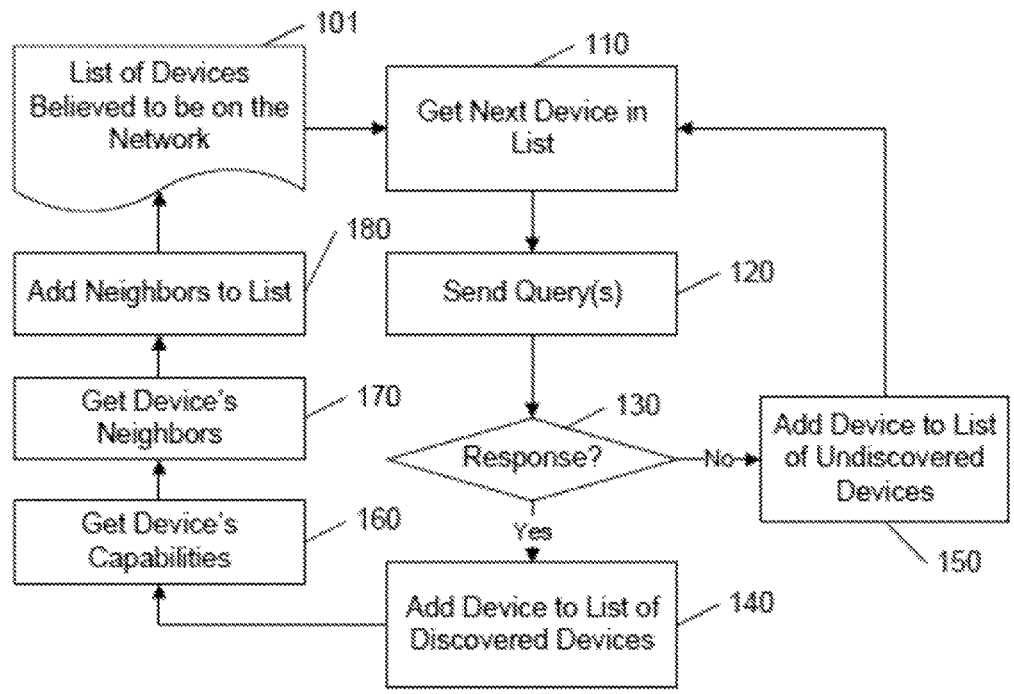
FIG. 1 illustrates an example flow diagram of a typical prior art auto-discovery process.
Figure 2:
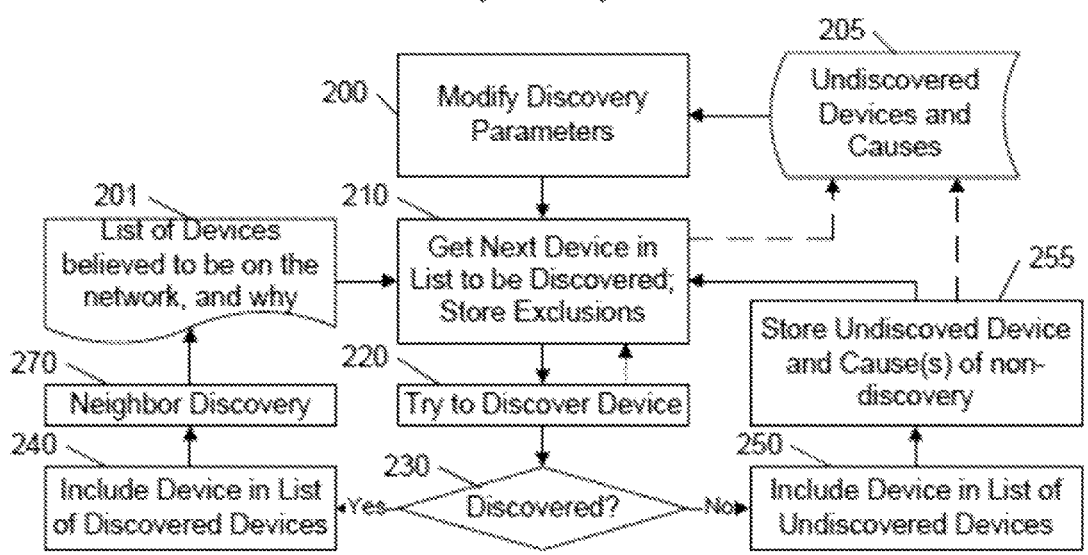
FIG. 2 illustrates an example flow diagram of an incremental and targeted auto-discovery process in accordance with this invention.

FIG. 2 illustrates an example flow diagram of an incremental and targeted auto-discovery process in accordance with this invention. As noted above, for the ease of explanation and understanding, this invention is presented using terms and examples common to the SNMP protocol, and common to current routing and other protocols. One of skill in the art will recognize that the principles presented herein are applicable regardless of particular protocols used on a network.

At 200, parameters used for auto-discovery in a prior run of the auto-discovery process are modified, based on indications of the causes of being unable to discover a device that had been believed to be on the network. As this invention addresses incremental and targeted improvement of the auto-discovery process, it is assumed in this description that at least one run of an auto-discovery process has been completed; if not, block 200 is the initial setting of the discovery parameters.

As used herein, discovery parameters include, for example, the aforementioned list of already-discovered devices, the include/exclude lists, and the hop-limit parameters, as well as an identification of which previously undiscovered devices are to be included/excluded from the discovery process. The list of devices 201 believed to be in the network will generally include all of the previously discovered and undiscovered devices on the network, and the discovery parameters may also identify which of these devices are to be discovered/rediscovered during the current discovery process. Because this invention addresses improving the discovery results, the modified discovery parameter may also include identifying devices that should be re-verified as still being present on the network, based, for example, on the duration since the device's last verification.

In a preferred embodiment, the modification of the discovery parameters is based on two types of causes of non-discovery: exclusion and failure to respond. If the cause of non-discovery was exclusion, a determination is made as to whether the exclusion remains valid, and whether one or more of the inclusion/exclusion lists should be modified to relax the exclusion requirements.

In an embodiment of this invention, the network manager is provided the option of specifying which, if any, inclusion/exclusion lists are allowed to be modified, whether the hop-limit parameters can be modified, and so on. To facilitate this authorization to modify the lists, a preferred embodiment of this invention includes an "Include Excluded Devices" option for modifying any and all inclusion/exclusion lists to allow each 'next device' to be included in the re-discovery process.

In another embodiment of this invention, the system may also be configured to query network devices for their current configurations, and to compare the current configurations to a set of prior configurations. Thereafter, the include/exclude device lists may be modified for the re-discovery process to target the discovery to segments of the network that are determined to have changed. In like manner, the network manager is also provided the option of targeting particular segments of the network for re-discovery, to facilitate scheduled routine updating as well as network troubleshooting and diagnostics.

If the cause of non-discovery is a failure to respond, a determination is made as to whether or not the device should be included in the rediscovery process, typically based on why the device was originally believed to be on the network. For example, if the belief is based on a highly reliable source, the likelihood of including the device in a re-discovery process will be higher than if the belief was loosely founded. This reliability is also likely to be affected by the recentness of the information leading to the belief, whether the device was identified explicitly, and so on. For example, if the device had been identified as a next-hop device in a router table, or identified in a vendor-proprietary neighbor discovery process, the inherent reliability of this information is better than the device being identified during a sweep of a subnet associated with an interface of the device.

The creation and storage of characteristics related to the causes of non-discovery, and their use in the modification of discovery parameters, are detailed further below.

At 210, the first/next device to be discovered in the list of devices believed to be on the network is identified. This step includes filtering the devices in the list to skip the devices that are to be excluded based on the current set of discovery parameters, such as devices excluded by the explicit include/exclude lists, devices beyond the current hop-limit relative to a currently identified device or set of devices, devices that have already been processed during the current run, and so on.

Devices from the list that are excluded from the subsequent discovery process are identified as undiscovered devices, and the cause for the exclusion is stored in the list of undiscovered devices and causes 205, for use in subsequent discovery runs, as illustrated by the dashed line from 210 to 205 in FIG. 2. In this case, the cause of non-discovery is exclusion. In a preferred embodiment, information supporting this cause is also stored, including, for example, identification of the particular inclusion/exclusion list or the hop-limit parameters that caused the exclusion.

At 220, having identified a device that is to be newly discovered, or re-discovered, queries are sent via the network to the device to elicit a response. As detailed above, any of a variety of techniques for discovering an identified device can be used, although ICMP and SNMP are the most commonly used protocols. Using the SNMP protocol, the network administrator will generally provide a list of SNMP 'community strings' that are believed to be used by one or more devices on the network. The community string is used as a password for gaining access to the device, and the default community string for most devices is 'public' for read-access to the device. If other community strings are used to restrict read access to devices on the network, these community strings will be needed to enable the device to respond to the discovery queries.

In a preferred embodiment, if the discovery process is limited to particular types of devices (e.g. discovering only routers), a responding device is also prompted at this point for its capabilities. If one or more of the capabilities does not match the type of devices being discovered, the device is identified as an excluded device because of an excluded type, and process 210 is repeated to get the next device to be discovered, as indicated by the dashed line to from 220 to 210 in FIG. 2

If, at 230, the device has been discovered to actually be on the network (and not an excluded device type) it is added to the list of discovered devices, at 240. Otherwise, the device is included in the list of undiscovered devices, at 250, and the undiscovered device and the cause of non-discovery is stored 255. In this case, the cause of non-discovery is failure to respond; generally, there is no additional information available to support a diagnosis of the cause, but if there is, it would also be preferably stored. Additionally, since there is no verification that the device actually exists on the network, the original and/or most recent reason(s) for believing that the device was on the network is also preferably stored, to assess whether to continue attempting to discover this device in subsequent runs, as discussed above, and as detailed further below.

If the device is added to the list of discovered devices, at 240, neighbors of the discovered device are identified, at 270. A variety of techniques can be employed to determine the neighbors of a device, and when a particular technique identifies a neighbor device, this technique is identified as the reason for believing that the neighbor device exists on the network. This information is stored with the device in the list of devices believed to be on the network, for subsequent storage in the list of undiscovered devices and causes, if the device subsequently fails to respond, as discussed above.

In a preferred embodiment, the neighbor discovery process includes a plurality of sub-processes, which are selectively enabled depending upon the particular device and its capabilities. These sub-processes include, for example, a Connected Subnet process, a Route Next Hop process, and one or more Vendor-proprietary Neighbor Discovery processes.

In the Connected Subnet process, the information contained in the ARP Table, the ipAddrTable and/or ipNetToMediaTable of the current device are used.

The ARP Table is used by an IP host to send packets to its IP neighbor on a local area network (LAN). When a packet addressed to a destination address serviced by the IP host, the ARP Table maps the packet's destination address to a physical address on the LAN.

The ipAddrTable includes a subnet mask associated with the device, and this subnet mask is used to perform a subnet sweep, to solicit responses from any other devices in this devices' subnet. The ipAddrTable also includes all addresses that are local to the device (e.g. the address of each interface on the device), and these addresses are used to map any of these addresses to this single device, to avoid identifying multiple neighbor devices as each address is subsequently processed for determining the neighbors of other devices.

The ipNetToMediaTable contains the translation of IP address to the associated MAC address for devices within one logical hop of the device that have actively communicated with the device. The fact that these devices were found via the ipNetToMediaTable will initially provide a high reliability that the devices are actually on the network, but after repeated failed attempts, it is reasonable to conclude that the non-responsive device has been removed, and exclude it from subsequent discovery after a given number of attempts.

In the Route Next Hop process, information in the ipRouteTable identifies the next hop router to use to reach any remote destination subnet. If MPLS, BGP, VPN, or VRF routes exist, the next hop routers and subnets are found in the "MPSL/BGP/VPN/VRF table". As in the case of the ipNetToMediaTable identification of neighbors within one hop, this information is highly reliable. Unlike the ipNetToMediaTable entries, however, this reliability remains high because an outdated next-hop for an address is removed from the routing table when a new next-hop is identified for that address.

Both the next hop router and the remote subnet information can be used to discover more devices. Each next hop router is identified as a neighbor device, and being an 'identified next hop router' is stored as the reason for belief that this router device is in the network.

Some or all of the remote destination subnets can be swept to solicit responses from devices on that subnet. As in the case of using the ipNetToMedia information to find potential neighbors, each of the identified devices may not be a close neighbor, but distant devices will generally be excluded based on the hop-limit parameters. Also, the number of identified remote subnets may be very large, because different routing protocols (OSPF, RIP, MPLS, Static, BGP, and so on) often provide different routes to reach the various destinations. In a preferred embodiment, the network administrator is provided the option to exclude particular routing protocols. This option is particularly well suited for limiting discovery to an internal network by excluding exterior gateway protocols, and vice versa.

In the Vendor-Proprietary Neighbor Discovery process, the information contained in the device's MIB (Management Information Base) table is used to identify the vendor, and if a neighbor discovery protocol exists for this vendor's products, it is used to find the device's neighbors. For example, the cdpTable, edpTable and fdpTable are used for identifying neighbors of devices made by Cisco Systems, Inc., Extreme Networks, and Foundry Networks, Inc., respectively.

In each of the above processes, the identified neighbors are saved in the list of devices believed to be on the network 201, along with an identification of why each device is believed to be on the network, which is generally an identification of the process used to find the device and any relevant parameters associated with the finding process.

Upon completion of the processing of the devices in the list 201, or upon termination of the processing for some other reason, all of the undiscovered devices and the cause of each non-discovery are stored 205, to be available for modifying the discovery parameters 200 for subsequent runs of this incremental and targeted auto-discovery process.

In the above description, the cause of non-discovery is either exclusion or failure to respond, and in a preferred embodiment, additional information is stored for each of these causes. In the case of exclusion, the source of the exclusion (e.g. an identification of the particular inclusion/exclusion list, or the next-hop parameters) is stored, and in the case of failure to respond, the source of the belief that the device was present on the network (e.g. identified next-hop router, sweep of a router subnet, present in ARP Table) is stored. If the stored information for an undiscovered device is a source of exclusion, the cause must have been 'exclusion'; if the stored information for an undiscovered device is a source of belief of the device's presence on the network, the cause must have been 'failure to respond'. Because the cause can be determined from the particular stored information, the cause itself need not be explicitly stored. That is, as defined herein, the storage of the information related to the cause of non-discovery constitutes storage of the cause.

Although this example embodiment defines particular causes of non-discovery, one of skill in the art will recognize that other causes of non-discovery and other information related to the cause of non-discovery may alternatively be defined, consistent with the principles of this invention.

As noted above, the network manager is provided a variety of options for controlling the modification of discovery parameters 200. The network manager can allow the modification of discovery parameters to change one or more of the inclusion or exclusion lists, change one or more of the hop-limit parameters, and so on. Such modifications will generally be enabled when changes occur relative to the structure of the network, and during the initial runs of the auto-discovery process. In like manner, the network manager can allow modification of the list of undiscovered nodes to be discovered, based on the source of belief of the device's presence on the network. As noted above, for example, if the source of belief is highly reliable, the manager will likely not allow the modification to the discovery parameters to remove any of the devices identified by that source of belief from the discovery process; whereas, if the source of belief has a low degree of reliability, the manager will likely allow the modification to remove devices having this source of belief from the discovery process after some number of attempts to discover the device.

In a preferred embodiment, the network manager is also provided the option of allowing the auto-discovery system to control the modification, based on a characterization of the network's stability, or other factors. This characterization may be determined by the auto-discovery process based on repeated runs, or may be explicitly defined by the network manager.

In an example embodiment, the network's stability may be characterized as Static, Dynamic, and Transitional. As the terms imply, a static network is one in which few, if any, changes occur over time, and a dynamic network is one that is in a continuous state of change. A transitional network is one in which a known change is introduced, such as the introduction of a new router into a generally static network. Given the characterization of the network, the system will control the modification of the discovery parameters accordingly.

The following tables provide an example of how a preferred embodiment of this invention will control the automated modification of the discover parameters. One of skill in the art will recognize that the particular set of rows and columns in these tables will be dependent upon the defined set of network characterizations and defined set of sources associated with each cause of non-discovery. These example tables are provided for illustration and ease of understanding.

TABLE 1

| Cause = Excluded; changes to source of exclusion | | | | |
|---|---|---|---|---|
| Network Character- | Address List | | Vendor List | | Hop-limit |
| ization | Include | Exclude | Include | Exclude | parameters |
| Static | No change | No change | No change | No change | No change |
| Transitional | Modify | No change | Modify | No change | Modify |
| Dynamic | Modify | Modify | Modify | Modify | Modify |

In the above Table 1, if the network is characterized as being static, no changes are likely to have occurred and there is no apparent reason to allow modifications to the current inclusion or exclusion lists, or to allow modifications to the current hop-limit parameters.

The terms 'modify' and 'no change' are used herein for convenience. As discussed above, the decision to modify the discovery parameters relative to a particular device is typically also a function of how often an attempt has been made to contact the device. In such a case, the term 'modify' may be interpreted to mean 'modify after only a few attempts', while the term 'no change' may be interpreted to mean 'modify only after a large number of attempts'. In a preferred embodiment, a default upper and lower number of attempts is provided for each discovery parameter to distinguish 'no change' from 'modify', and the network manager is provided the option of setting such limits as well.

Returning to Table 1, if the network is characterized as being dynamic, with addresses being added and deleted, the current inclusion/exclusion lists are likely to be out-of-date, as well as the hop-distances between devices; accordingly, it is appropriate to allow modification of each of these exclusion sources to discover devices that were excluded in the prior auto-discovery run.

If a change is known to have occurred, placing the network in a transitional state, the modifications are appropriately more selective. With a purposeful change, explicit exclusions are likely to remain in effect, whereas newly added devices are not likely to appear in the explicit inclusion lists. Accordingly, it is appropriate to allow modification of the include lists, but not the exclude lists to discover devices that were excluded in the prior auto-discovery run. In like manner, a purposeful change is likely to affect the hop distances among devices, and it is appropriate to allow modifications to the hop-limit parameters to discover devices that were excluded by the prior hop-limit parameters.

TABLE 2

| Cause = Failed to respond; changes to list of devices to discover | | | | | |
|---|---|---|---|---|---|
| Network Character- | | Subnet Sweep | | | Vendor |
| ization | ARP | IP | Route | Next Hop | Neighbor |
| Static | Modify | Modify | Modify | Modify | Modify |
| Transitional | No change | Modify | Modify | No change | No change |
| Dynamic | No change | No change | No change | No change | No change |

Table 2 identifies whether the system should be allowed to modify the list of devices to be discovered. In this example, the term 'modify' is interpreted to mean, in general, that the system is allowed to modify the list by removing the device from the list after a small number of discovery attempts, and the term 'no change' is interpreted to mean do not remove the device from the list until after a large number of discovery attempts; small being generally below 5, and large being generally well above 10.

If the network is stable, it is likely that if a device has not responded after a few attempts, it is likely that the device has been removed from the network, and should be removed from the list of devices to be discovered.

On the other hand, if the network is dynamic and in a continuous state of flux, there is no reason to assume that the device is not merely temporarily absent, and should not be removed from the list of devices to be discovered.

If the network is undergoing a transition, then the removal of the device from the list of devices to be discovered should be based on the reliability of the most recent source of belief that the device is on the network. As noted above, if the device is believed to be on the network based on a reliable source, such as an entry in the ARP table or an entry as the next hop device in a routing table, a failure to respond is likely due to the device being too busy to respond, and it is appropriate to attempt to continue to keep the device in the list of devices to be discovered. On the other hand, if the reason for believing that the device is on the network is based on the sweep of identified subnets, then it is appropriate to allow removal of the device from the list after only a few attempts to discover the device.

As can be seen, by allowing the network manager to characterize the stability of the network, the variety of options for modifying the discovery parameters for the next auto-discovery run can be automatically set, without requiring the network manager to specify each particular option. In a preferred embodiment, the network manager is also provided the option of modifying the aforementioned tables, and to override any particular choice of allowable modification.

Figure 3:
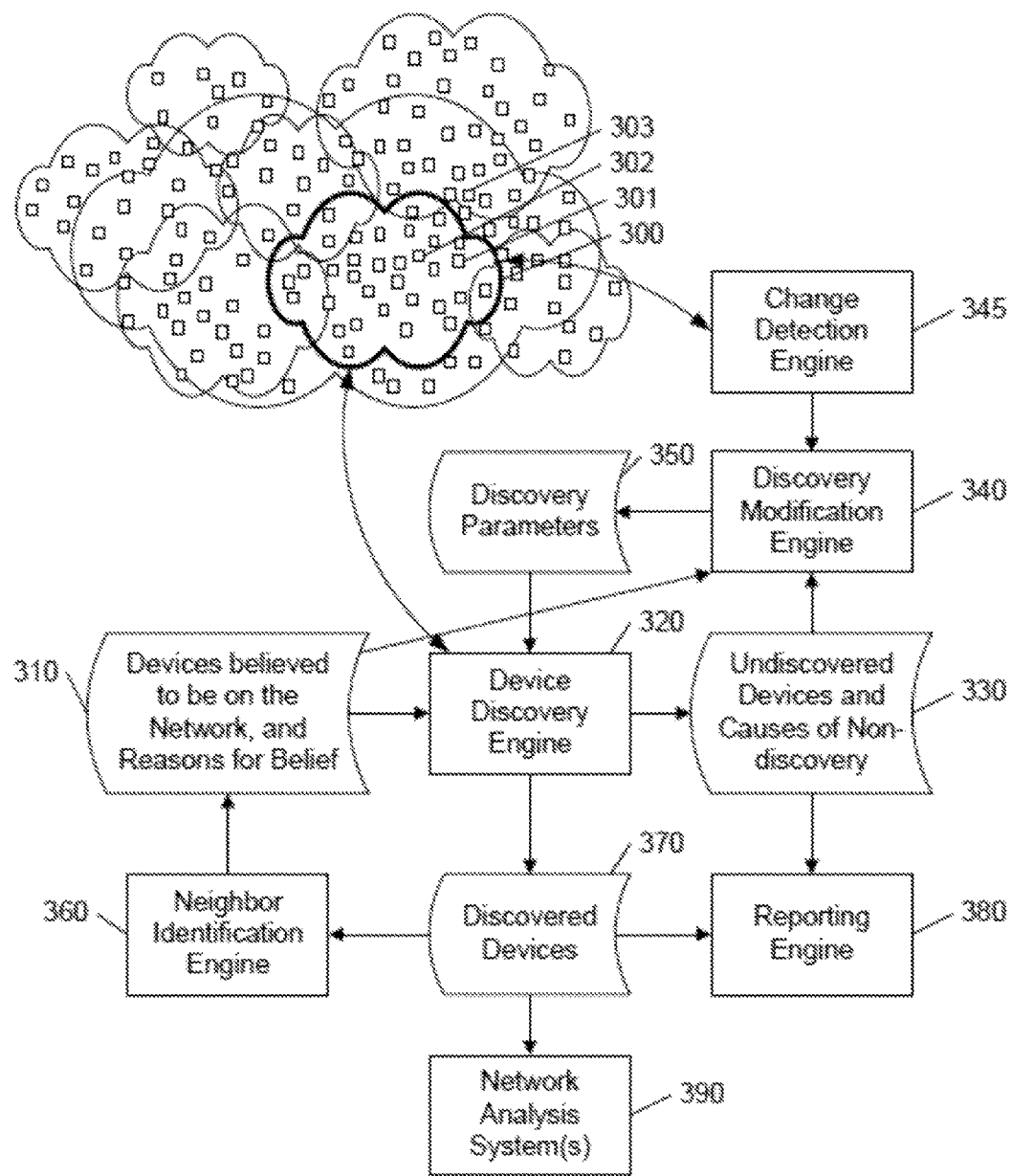
FIG. 3 illustrates an example block diagram of an auto-discovery system in accordance with this invention.

FIG. 3 illustrates an example block diagram of an embodiment of an incremental and targeted auto-detection system in accordance with this invention. As discussed above, the purpose of the auto-detection system is to distinguish devices 301, 302 that are within a target network 300 from the devices 303 that are outside the network 300. Assuming that the system has performed at least one auto-detection run, some devices 301 will have been discovered, while others 302 remain undiscovered. In FIG. 3, the illustrated devices are devices that actually exist, or devices that are believed to exist, typically based on a set of 'seed' devices, and identified neighbors of the seed devices, and neighbors of these neighbors, as discussed above.

These devices 301, 302, 303 will have been included in the list of devices 310 that are believed to be on the network 300, and the device discovery engine 320 will have discovered the devices 301, and not discovered devices 302, 303 based on a set of discovery parameters 350, and based on attempts to communicate with these devices via the network 300. The term 'engine' is used herein to define a set of one or more processes operating on a processing machine to perform the identified function. Such an engine may be embodied as specifically designed hardware, or, equivalently, as a processor programmed to perform the identified function.

In accordance with the principles of this invention, when the devices 302, 303 are not discovered, an identification of the devices 302, 303 and the cause of non-discovery is stored as a dataset 330 in a memory of the auto-detection system. In a subsequent run of the auto-detection system, a discovery modification engine 340 uses these identified undiscovered devices and causes of non-discovery to modify the set of discovery parameters 350, in a attempt to better determine whether devices 302, 303 are within the network 300 or outside the network 300.

Also illustrated in FIG. 3 is a change detector 345. As noted above, the subsequent discovery process can be configured to target select segments of the network. The change detector 345 is configured to query network devices for their current configurations and to compare the current configurations to a stored set of prior configurations. The discovery modification engine 340 is configured to also or alternatively modify the discovery parameters 350 based on the determined changes in the network. The change detector 345 is also preferably configured to allow the network manager to identify particular segments of the network for the discovery process, and provide these identified segments as targets to the discovery modification engine 340.

In a preferred embodiment, the system allows the network manager to store different sets of discovery parameters, and to identify changes to the discovery parameters as either temporary or permanent. In a targeted discovery for a particular segment, for example, the modification of an include/exclude list to include the targeted segment and exclude others will generally be a temporary modification of the include/exclude list. In this manner, the re-discovery tasks can be performed relatively independent of each other, depending upon the particular purpose of the re-discovery task.

Using this new set of discovery parameters 350, the device discovery engine 320 attempts to communicate with the devices 302, 303 in order to verify whether these devices are actually on the network 300. When a device is discovered to be on the network 300, it is added to the set of discovered devices 370, and a neighbor identification engine 360 identifies neighbors of the discovered device and updates the set of devices believed to be on the network 310.

In accordance with the principles of this invention, when a device is added to the set of devices believed to be on the network, the basis for this belief is also stored in the dataset 310. In the processing of the causes of non-discovery 330, if the cause of non-discovery is a failure to respond, the discovery modification engine 340 uses this basis of belief to determine whether to modify the discovery parameters 350 to exclude the undiscovered device from further discovery attempts, as discussed above.

As discussed above, the set of discovery parameters 350 includes a variety of inclusion/exclusion lists. If the cause of non-discovery of a device is exclusion, the discovery modification engine 340 is configured to selectively modify these lists to discover devices 302 in the network 300 that should not have been excluded.

Having auto-discovered the devices on the network 300, the set of discovered devices 370 is provided to other network analysis systems 390. In a preferred embodiment of this invention, when the device is queried to determine its neighbors, this information is also provided to such network analysis systems 390, so that the topology of the network 300 can be determined.

The sets of discovered 370 and non-discovered 330 devices are also provided to a reporting engine 380, to inform the network manager of the results of the auto-discovery process.

In a preferred embodiment, the reporting engine 380 has access to all of the datasets 310, 330, 350, 370, and is configured to provide a variety of reports based on these datasets.

FIGS. 4A-4B illustrate two example reports provided by the reporting engine 380.

FIG. 4A illustrates a report based on the set of undiscovered devices 330, and specifically, the devices that were undiscovered because of exclusion. The address of each excluded undiscovered device is displayed with an identification of the exclusion list that caused the exclusion.

FIG. 4B illustrates a report based on the set of devices believed to be on the network 310, and specifically, the results of the neighbor identification engine 360 for a set of devices (10.1.0.9, 10.10.1.1, and 192.168.51.36). Each discovered neighbor of each of these devices is identified, as well as the source of the neighbor discovery. Of particular note, the report identifies each table within which the neighbor device appears. As discussed above, the discovery modification engine 340 is configured to determine whether to repeat the discovery process for each undiscovered device, based on the reliability of the belief that the device actually exists. When the device appears on multiple lists, this reliability increases, and the likelihood that the discovery modification engine retains the device on the list of devices to be discovered in the discovery parameters 350 increases as well.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof, f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements, and can include an immeasurable number of elements.

What is claimed is:

1. A method of discovering devices in a network, said method comprising:

discovering devices in the network based on a first set of discovery parameters, wherein the first set of discovery parameters indicate devices that are believed to be in the network;

identifying an undiscovered device in the network that was not discovered by the discovery with the first set of discovery parameters;

determining a cause for failing to discover the undiscovered device with the first set of discovery parameters;

modifying the first set of discovery parameters into a second set of discovery parameters based on the cause for failing to discover the undiscovered device; and attempting to discover the undiscovered device in the network based on the second set of discovery parameters.

2. The method of claim 1, wherein determining the cause for failing to discover the undiscovered device comprises determining that the first set of discovery parameters indicated exclusion of the undiscovered device.

3. The method of claim 2, wherein the first set of discovery parameters indicated exclusion based on an address in the network.

4. The method of claim 2, wherein the first set of discovery parameters indicated exclusion based on a vendor of the undiscovered device.

5. The method of claim 2, wherein the first set of discovery parameters indicated exclusion based on a hop limit.

6. The method of claim 1, wherein determining the cause for failing to discover the undiscovered device comprises determining that the undiscovered device failed to respond to discovery with the first set of discovery parameters.

7. The method of claim 1, wherein determining devices that are believed to be in the network comprises identifying devices in an address resolution protocol table from previously discovered devices in the network.

8. The method of claim 1, wherein determining devices that are believed to be in the network comprises identifying devices based on an IP sub net sweep.

9. The method of claim 1, wherein determining devices that are believed to be in the network comprises identifying devices based on a routing table subnet sweep.

10. The method of claim 1, wherein determining devices that are believed to be in the network comprises identifying devices based on a routing table next hop.

11. The method of claim 1, wherein determining devices that are believed to be in the network comprises identifying neighbors of discovered devices in the network.

12. The method of claim 1, wherein modifying the first set of discovery parameters into a second set of discovery parameters comprises modifying the first set of discovery parameters based on a characterization of the network.

13. The method of claim 12, wherein the characterization of the network may indicate that the network is characterized as one of static, transitioning, or dynamic.

* * * * *